(12) United States Patent
Ding et al.

(10) Patent No.: US 11,523,467 B2
(45) Date of Patent: Dec. 6, 2022

(54) GROUP CONTROL DEVICE

(71) Applicant: CHINA UNIVERSITY OF PETROLEUM BLUE SKY(QINGDAO) PETROLEUM TECHNOLOGY CO., LTD, Qingdao (CN)

(72) Inventors: Tao Ding, Qingdao (CN); Shouyuan Zhao, Qingdao (CN); Chuan Yan, Qingdao (CN); Hongming Wang, Qingdao (CN); Hongbo Li, Qingdao (CN); Zhongxian Gao, Qingdao (CN); Zhihao Wei, Qingdao (CN); Faliang Gong, Qingdao (CN); Zhendong Wu, Qingdao (CN); Fanwei Meng, Qingdao (CN)

(73) Assignee: CHINA UNIVERSITY OF PETROLEUM BLUE SKY(QINGDAO) PETROLEUM TECHNOLOGY CO., LTD, Qingdao (CN)

( * ) Notice: Subject to any disclaimer, the term of this patent is extended or adjusted under 35 U.S.C. 154(b) by 0 days.

(21) Appl. No.: 17/134,223

(22) Filed: Dec. 25, 2020

(65) Prior Publication Data
US 2021/0195685 A1 Jun. 24, 2021

(30) Foreign Application Priority Data
Dec. 18, 2019 (CN) .......................... 201911317541.6

(51) Int. Cl.
*H04W 28/02* (2009.01)
*H04W 28/24* (2009.01)
(Continued)

(52) U.S. Cl.
CPC ....... *H04W 84/20* (2013.01); *H04W 28/0226* (2013.01); *H04W 28/24* (2013.01); *H04W 52/0212* (2013.01)

(58) Field of Classification Search
CPC .... G06F 13/24; G06F 13/4068; G06F 3/0416; H01R 24/562; H04W 84/20; H04W 28/0226; H04W 28/24
(Continued)

(56) References Cited

U.S. PATENT DOCUMENTS

| | | | |
|---|---|---|---|
| 2012/0303939 A1* | 11/2012 | Cain | H02J 50/23 713/1 |
| 2015/0330817 A1* | 11/2015 | Law | G01D 21/02 702/3 |
| 2019/0171540 A1* | 6/2019 | Xu | G06F 11/3668 |

\* cited by examiner

*Primary Examiner* — Khaled M Kassim
*Assistant Examiner* — Jason A Harley

(57) ABSTRACT

A group control device includes a central processing system. An output port of the central processing system is electrically connected to an input port of a display unit through a first wire. An output port of the display unit is electrically connected to an input port of a signal feedback module through a second wire. The output port of the signal feedback module is electrically connected to an input port of the central processing system through a third wire. The input port of the central processing system is electrically connected to an input port of the group control host operating terminal. The input port of the group control host operating terminal is electrically connected to an output port of a data sending module. The central processing system is bidirectionally connected with a retrieval and extraction module through wireless connection.

6 Claims, 3 Drawing Sheets

(51) Int. Cl.
*H04W 52/02* (2009.01)
*H04W 84/20* (2009.01)
(58) Field of Classification Search
USPC .................................... 710/305, 2; 455/557
See application file for complete search history.

GROUP CONTROL DEVICE

CROSS-REFERENCE TO PRIOR APPLICATION

This application claims the benefit of Chinese Patent Application No. 201911317541.6 filed on Dec. 18, 2019, the contents of which are incorporated herein by reference.

TECHNICAL FIELD

The present disclosure relates to a field of group control technology, and in particular to a group control device.

BACKGROUND

Group control devices are divided into wire-controlled group control devices and cloud-controlled group control devices. The group control device generally uses a computer to control hundreds of mobile phones and to realize simultaneous operation of hundreds of mobile phones, which are used to establish enterprise-level hardware management systems and automated marketing system lights. Through a group control software, a user can free up his hands and is able to use one computer to control hundreds of mobile phones, and operates WECHAT at the same time to achieve an effect of computer group control of mobile phones, which greatly saves labor costs, improves office and WECHAT marketing efficiency. Wire-controlled group control devices require the user to build a server and provide the mobile phones, while cloud-controlled group control devices do not require the user to build the server and mobile phones.

A lot of power data are generated in a power system. These data are transmitted by a group control host to each display terminal. The display terminals receive the power data. However, the conventional group control host fails to receive feedback signals of the display terminals in time after the power data are transmitted. That is, the conventional group control host is unable to realize real data mutual feed, which reduces practicability of the group control device. Moreover, it causes inconvenience to the work of the power system, which does not meet the actual use requirements.

SUMMARY

In views of defects in the prior art, the present disclosure provides a group control device to solve problems that a conventional group control host fails to receive feedback signals of display terminals in time after power data are transmitted and the conventional group control host is unable to realize real data mutual feed, which reduce practicability of the group control device, cause inconvenience to the work of a power system, and do not meet actual use requirements.

To achieve the above object, the present disclosure provides a group control device. The group control device comprises a central processing system. An output port of the central processing system is electrically connected to an input port of a display unit through a first wire. An output port of the display unit is electrically connected to an input port of a signal feedback module through a second wire. The output port of the signal feedback module is electrically connected to an input port of the central processing system through a third wire. The input port of the central processing system is electrically connected to an input port of the group control host operating terminal through a fourth wire.

Optionally, the input port of the group control host operating terminal is electrically connected to an output port of a data sending module through a fifth wire. The central processing system is bidirectionally connected with a retrieval and extraction module through wireless connection.

Optionally, the retrieval and extraction module is bidirectionally connected with a backup unit through wireless connection. An input port of the backup unit is electrically connected to an output end of a storage module through a sixth wire.

Optionally, an input port of the storage module is electrically connected to the output port of the central processing system through a seventh wire. The output port of the central processing system is electrically connected to an input end of an interception protection module through an eighth wire.

Optionally, an output port of the interception protection module is electrically connected to an input port of a send interrupt module through a ninth wire. An input port of the send interrupt module is electrically connected to the output port of the central processing system through a tenth wire.

Optionally, the group control host operating terminal comprises a data receiving module, an integrated processing module, and a data transmission module. An output port of the data receiving module is electrically connected to an input port of the integrated processing module through an eleventh wire.

Optionally, an output port of the integrated processing module is electrically connected to an input port of the data transmission module through a twelfth wire.

Optionally, N display terminals are disposed inside the display unit.

In the present disclosure, the output port of the central processing system is electrically connected to the input port of the display unit through the first wire. The output port of the display unit is electrically connected to the input port of the signal feedback module through the second wire. The output port of the signal feedback module is electrically connected to the input port of the central processing system through a third wire. The input port of the central processing system is electrically connected to the input port of the group control host operating terminal through the fourth wire.

The input port of the group control host operating terminal is electrically connected to the output port of the data sending module through the fifth wire. The central processing system is bidirectionally connected with the retrieval and extraction module through wireless connection. The group control host operating terminal comprises the data receiving module, the integrated processing module, and the data transmission module. The output port of the data receiving module is electrically connected to the input port of the integrated processing module through the eleventh wire. The output port of the integrated processing module is electrically connected to the input port of the data transmission module through the twelfth wire. The N display terminals are disposed inside the display unit. By setting of these structures, the group control device receives feedback signals from each display terminal in time to realize mutual feedback of information after the group control host operating terminal successfully transmits power data to each display terminal, which laid foundation for follow-up normal use of the group control device.

In the present disclosure, the input port of the storage module is electrically connected to the output port of the central processing system through the seventh wire. The output port of the central processing system is electrically connected to the input end of the interception protection module through the eighth wire. The output port of the interception protection module is electrically connected to the input port of the send interrupt module through the ninth wire. The input port of the send interrupt module is electrically connected to the output port of the central processing system through the tenth wire. The group control host operating terminal saves the transmitted data in the background and backs up at the same time to prevent data loss and facilitate the user to find it later. Meanwhile, the interception protection module intercepts malicious advertisements and virus information during data transmission. If interception of the interception protection module is unsuccessful, the data transmission is stopped by the send interrupt module.

1—central processing system; 2—display unit; 3—signal feedback module; 4—group control host operating terminal; 41—data receiving module; 42—integrated processing module; 43—data transmission module; 5—data sending module; 6—retrieval and extraction module; 7—backup unit; 8—storage module; 9—interception protection module; and 10—send interrupt module.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Figure 1:
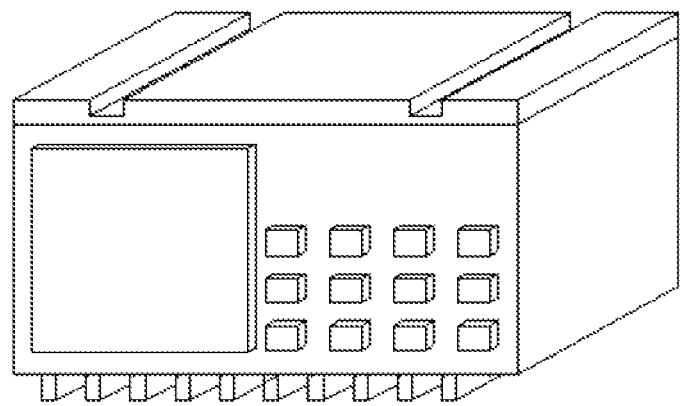
FIG. 1 is a perspective view showing a structure of the present disclosure.
Figure 2:
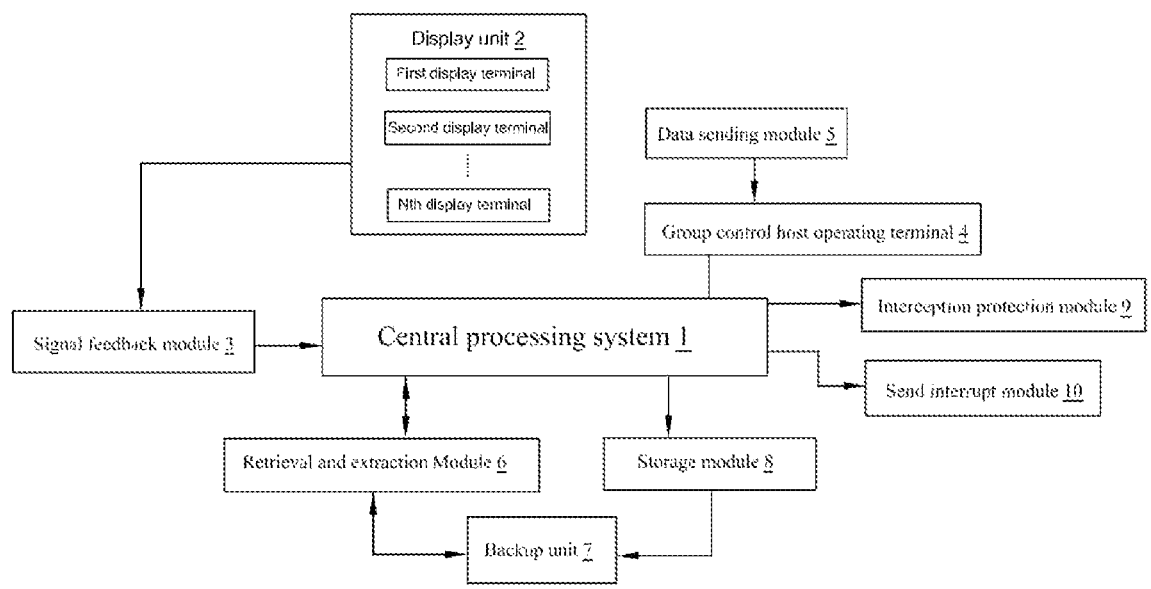
FIG. 2 is a block diagram of a structure of a system of the present disclosure.
Figure 3:
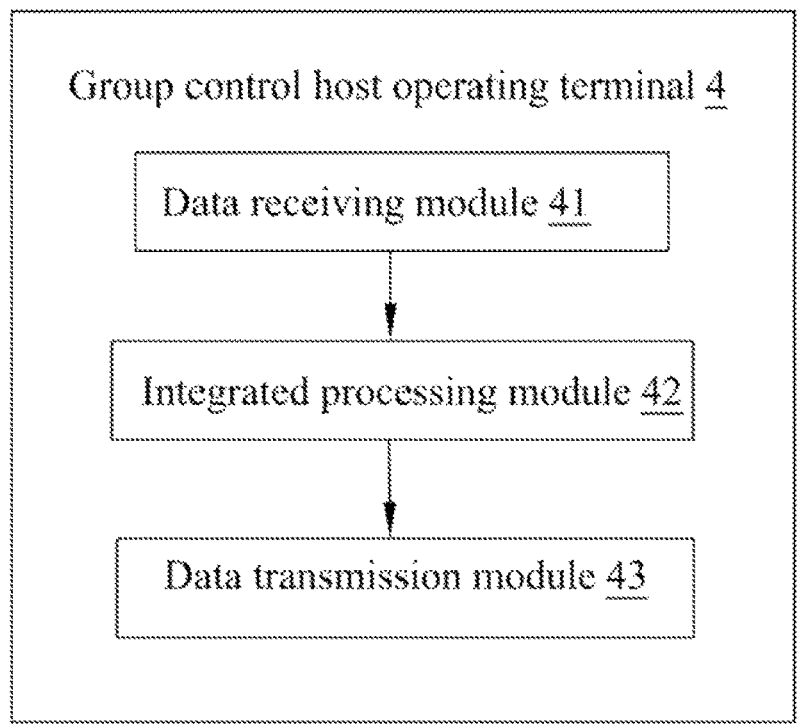
FIG. 3 is a block diagram of a group control host operating terminal of the present disclosure.
Figure 4:
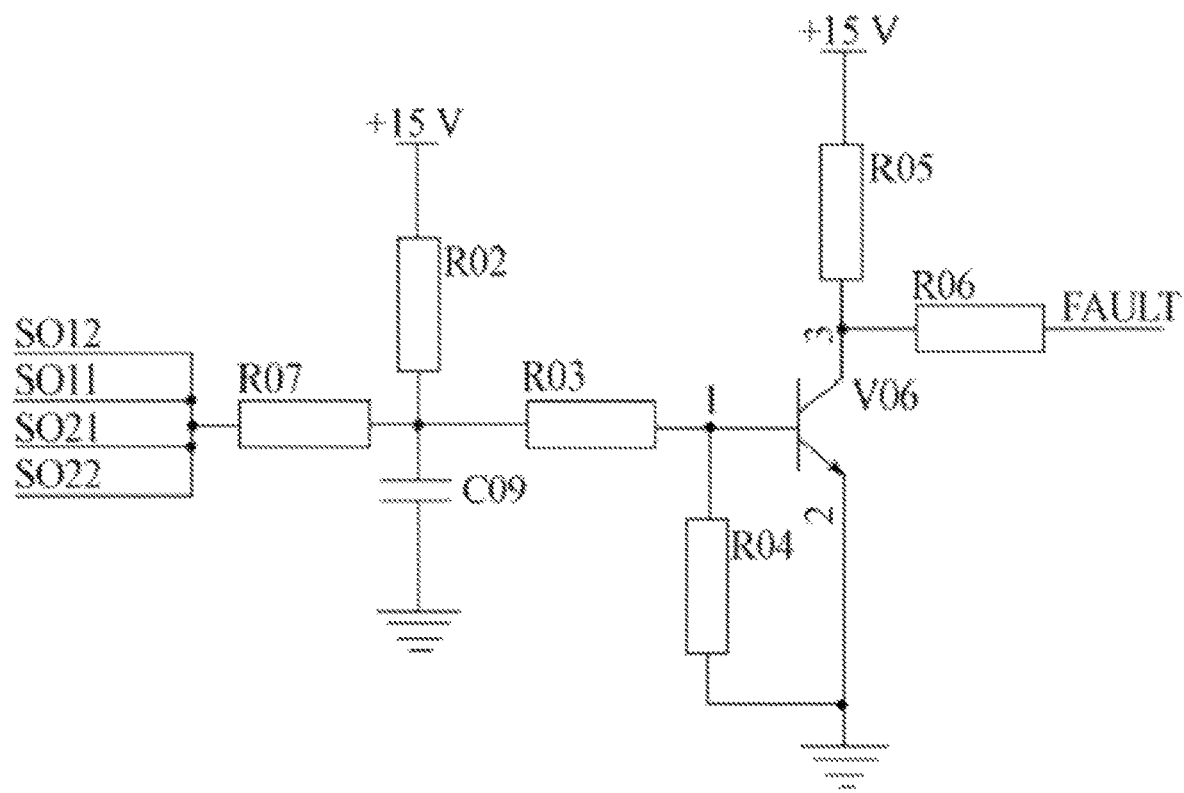
FIG. 4 is a circuit diagram of a signal feedback module of the present disclosure.

As shown in FIGS. 1-4, the present disclosure provides a group control device that receives feedback signals from each display terminal in time to realize mutual feedback of information after a group control host operating terminal successfully transmits power data to each display terminal, which laid foundation for follow-up normal use of the group control device.

The group control device comprises a central processing system 1. An output port of the central processing system 1 is electrically connected to an input port of a display unit 2 through a first wire. N display terminals are disposed inside the display unit 2.

An output port of the display unit 2 is electrically connected to an input port of a signal feedback module 3 through a second wire. The output port of the signal feedback module 3 is electrically connected to an input port of the central processing system 1 through a third wire. The feedback module 3 is a feedback circuit. The feedback circuit is configured to recover parts or all of output signals (voltage or current) of an amplifier to an input port of the amplifier, and then compare the recovered output signals with input signals (by adding or subtracting the inputs signal and the recovered output signals), and then use a compared effective input signal to control the output. This is a feedback process of the amplifier. The input port of the central processing system 1 is electrically connected to an input port of a group control host operating terminal 4 through a fourth wire.

As a computing and control core of a computer system, the central processing system 1 is a final execution unit for information processing and program operation. The central processing system 1 is a central processing unit (CPU). Since creation of the CPU, it has made great developments in logical structure, operating efficiency, and functional extension. A model of the central processing system 1 IS selected from ARM9. The central processing system 1 is one of the main equipment of a computer and the core accessory in the computer. The central processing system 1 are mainly configured to interpret computer instructions and process data in computer software. The CPU is the core component of the computer responsible for reading instructions, decoding and executing instructions. The central processing system 1 mainly comprises two portions. To the specific, a controller and an arithmetic device. The central processing system 1 further comprises a high-speed buffer memory and a bus that realizes data control. Three core components of the computer are the CPU, an internal memory, an input/output device. The central processing system are mainly configured to process instructions, perform operations, control time, and process data. In the computer architecture, the CPU is the core hardware unit that controls and deploys all hardware resources of the computer (such as the memory, input units and output units) and performs general operations. The CPU is the computing and control core of the computer. The operation of all software layers in the computer system are eventually mapped to the operation of the CPU through an instruction set.

The input port of the group control host operating terminal 4 is electrically connected to an output port of a data sending module 5 through a fifth wire. The group control host operating terminal 4 comprises a data receiving module 41, an integrated processing module 42, and a data transmission module 43. An output port of the data receiving module 41 is electrically connected to an input port of the integrated processing module 42 through an eleventh wire. An output port of the integrated processing module 42 is electrically connected to an input port of the data transmission module 43 through a twelfth wire. The central processing system 1 is bidirectionally connected with a retrieval and extraction module 6 through wireless connection. The retrieval and extraction module 6 is bidirectionally connected with a backup unit 7 through wireless connection. An input port of the backup unit 7 is electrically connected to an output end of a storage module 8 through a sixth wire. An input port of the storage module 8 is electrically connected to the output port of the central processing system 1 through a seventh wire.

A model of the storage module 8 is selected from XBOX360. The storage module 8 generally has functions of storing data, reading data, and writing data. The storage module 8 uses 8-bit binary as a storage unit, that is, a byte. Each storage unit has an address, which is an integer code and is represented by a binary integer. Variables in the program correspond to the storage unit of a main memory. Names of the variables corresponds to addresses of the storage units. Content of the variables correspond to the data stored in the storage units. The address of each storage unit is generally represented by a hexadecimal number. And each memory address stores a set of binary (or hexadecimal) numbers, usually called the content of the address, The output port of the central processing system 1 is electrically connected to an input end of an interception protection module 9 through an eighth wire.

An output port of the interception protection module 9 is electrically connected to an input port of a send interrupt module 10 through a ninth wire. An input port of the send interrupt module 10 is electrically connected to the output port of the central processing system 1 through a tenth wire. The storage module 8 stores the transmitted data in the background and the backup unit 7 backs up the transmitted data at the same time to prevent data loss and facilitate the user to find it later. Meanwhile, the interception protection module 9 intercepts malicious advertisements and virus information during data transmission. If interception of the interception protection module is unsuccessful, the data transmission is stopped by the send interrupt module 10.

When in use, externally collected power data is sent to the group control host operating terminal 4 through the data sending module 43, and the power data is received by the data receiving module 41 disposed inside the group control host operating terminal 4, The power data is integrated and processed through the integrated processing module 42. Then, the integrated power data is sent from the central processing system 1 to the display terminals disposed inside the display unit 2 through the data transmission module 43. After the display terminals receive the power data, the received signals (power data) are fed back to the group control host operating terminal 4 from the central processing system 1 through the signal feedback module 3. Meanwhile, the transmitted power data is sent to the storage module 8 for storage and is backed up by the backup unit 7 to prevent date loss. The interception protection module 9 intercepts malicious advertisements and virus information during data transmission. If interception of the interception protection module is unsuccessful, the data transmission is stopped by the send interrupt module 10. Thus, the processing of the power data is completed.

It should be noted that in the present disclosure, relational terms such as "first" and "second" are only used to distinguish one entity or operation from another entity or operation, and do not intended to limit actual relationships or order between these entities or operations. Moreover, the terms "include", "comprise" or any other variants thereof are intended to cover non-exclusive inclusion, so that a process, method, article, or device that includes a series of elements includes not only those elements, but also includes other elements, or also include elements inherent to this process, method, article or device.

Although the embodiments of the present disclosure are shown and described, those of ordinary skill in the art can understand that various changes, modifications, substitutions, and variations can be made based on these embodiments without departing from the principle and spirit of the present disclosure. The scope of the present invention is defined by the appended claims and their equivalents.

What is claimed is:

1. A group control device, comprising a central processing system;
wherein an output port of the central processing system is electrically connected to an input port of a display unit through a first wire; an output port of the display unit is electrically connected to an input port of a signal feedback module through a second wire; an output port of the signal feedback module is electrically connected to an input port of the central processing system through a third wire; the input port of the central processing system is electrically connected to an input port of a group control host operating terminal through a fourth wire;
a number of N display terminals are disposed inside the display unit;
the group control host operating terminal comprises a data receiving module, an integrated processing module, and a data transmission module; an output port of the data receiving module is electrically connected to an input port of the integrated processing module through an eleventh wire; externally collected power data is sent to the group control host operating terminal through the data sending module, and the power data is received by the data receiving module disposed inside the group control host operating terminal, the power data is integrated and processed through the integrated processing module; the integrated power data is sent from the central processing system to the N display terminals disposed inside the display unit through the data transmission module; after the N display terminals receive the power data, the power data are fed back to the group control host operating terminal from the central processing system through the signal feedback module; and
the group control device receives feedback signals from each of the display terminals to have mutual feedback of information after the group control host operating terminal successfully transmits the power data to each of the display terminals.

2. The group control device according to claim 1, wherein the input port of the group control host operating terminal is electrically connected to an output port of a data sending module through a fifth wire; and the central processing system is bidirectionally connected with a retrieval and extraction module through a wireless connection.

3. The group control device according to claim 2, wherein the retrieval and extraction module is bidirectionally connected with a backup unit through the wireless connection; and an input port of the backup unit is electrically connected to an output end of a storage module through a sixth wire.

4. The group control device according to claim 3, wherein an input port of the storage module is electrically connected to the output port of the central processing system through a seventh wire; the output port of the central processing system is electrically connected to an input end of an interception protection module through an eighth wire.

5. The group control device according to claim 4, wherein an output port of the interception protection module is electrically connected to an input port of a send interrupt module through a ninth wire; an input port of the send interrupt module is electrically connected to the output port of the central processing system through a tenth wire; the interception protection module is configured to intercept malicious advertisements and virus information during data transmission; if interception of the interception protection module is unsuccessful, the data transmission is stopped by the send interrupt module.

6. The group control device according to claim 1, wherein an output port of the integrated processing module is electrically connected to an input port of the data transmission module through a twelfth wire.

\* \* \* \* \*